(12) United States Patent
Park et al.

(10) Patent No.: US 7,644,447 B2
(45) Date of Patent: Jan. 5, 2010

(54) SCANNING PROBE MICROSCOPE CAPABLE OF MEASURING SAMPLES HAVING OVERHANG STRUCTURE

(75) Inventors: Sang-il Park, Seongnam (KR); Yong-Seok Kim, Seoul (KR); Jitae Kim, Anyang (KR); Sang Han Chung, Seoul (KR); Hyun-Seung Shin, Incheon (KR); Jung-Rok Lee, Yongin (KR); Euichul Hwang, Seongnam (KR)

(73) Assignee: Park Systems Corp., Seoul (KR)

( * ) Notice: Subject to any disclaimer, the term of this patent is extended or adjusted under 35 U.S.C. 154(b) by 44 days.

(21) Appl. No.: 11/601,144

(22) Filed: Nov. 17, 2006

(65) Prior Publication Data

US 2008/0078932 A1 Apr. 3, 2008

(30) Foreign Application Priority Data

Sep. 29, 2006 (KR) .................. 10-2006-0096399

(51) Int. Cl.
*G01N 23/00* (2006.01)

(52) U.S. Cl. .................. 850/1; 250/306; 250/307; 850/3; 850/21; 850/22; 850/52; 850/63; 977/850; 977/851; 977/872; 977/873; 977/874

(58) Field of Classification Search .......... 250/306, 250/307, 309, 310, 440.11, 442.11; 977/850, 977/851, 852, 854, 870, 873, 874, 872, 865, 977/863; 73/105; 850/1, 3, 21, 22, 52, 63

See application file for complete search history.

(56) References Cited

U.S. PATENT DOCUMENTS 5,103,095 A * 4/1992 Elings et al. .................. 850/1
5,199,021 A * 3/1993 Hatanaka et al. ............ 369/126
5,239,863 A * 8/1993 Kado et al. ................... 73/105
5,283,442 A * 2/1994 Martin et al. .......... 250/559.22
5,347,854 A * 9/1994 Martin et al. .................. 73/105
5,382,795 A * 1/1995 Bayer et al. ................. 250/306
5,400,647 A * 3/1995 Elings .......................... 73/105

(Continued)

FOREIGN PATENT DOCUMENTS

JP 07-325090 12/1995

(Continued)

OTHER PUBLICATIONS

Murayama, et al., "Side-Wall Measurement Using Tilt-Scanning Method in Atomic Force Microscope" Japanese Journal of Applied Physics, vol. 45, No. 6B, 2006, pp. 5423-5428.

*Primary Examiner*—David A Vanore
*Assistant Examiner*—Michael J Logie
(74) *Attorney, Agent, or Firm*—Patterson & Sheridan, LLP

(57) ABSTRACT

Provided is a scanning probe microscope capable of precisely analyzing characteristics of samples having an overhang surface structure. The scanning probe microscope comprises a first probe, a first scanner changing a position of the first probe along a straight line, and a second scanner changing a position of a sample in a plane, wherein the straight line in which the position of the first probe is changed by using the first scanner is non-perpendicular to the plane in which the position of the sample is changed by using the second scanner.

10 Claims, 12 Drawing Sheets

U.S. PATENT DOCUMENTS

| | | | | |
|---|---|---|---|---|
| 5,418,363 | A * | 5/1995 | Elings et al. | 250/306 |
| 5,519,212 | A * | 5/1996 | Elings et al. | 250/234 |
| 5,705,814 | A * | 1/1998 | Young et al. | 850/2 |
| 5,949,070 | A * | 9/1999 | Gamble | 850/15 |
| 6,091,124 | A * | 7/2000 | Bayer et al. | 257/417 |
| 6,169,281 | B1 * | 1/2001 | Chen et al. | 250/234 |
| 6,246,054 | B1 * | 6/2001 | Toda et al. | 250/306 |
| 6,310,342 | B1 | 10/2001 | Braunstein et al. | |
| 6,441,371 | B1 * | 8/2002 | Ahn et al. | 850/1 |
| 6,489,611 | B1 * | 12/2002 | Aumond et al. | 250/306 |
| 6,677,567 | B2 * | 1/2004 | Hong et al. | 250/201.3 |
| 6,787,768 | B1 * | 9/2004 | Kley et al. | 250/306 |
| 6,862,921 | B2 * | 3/2005 | Chand et al. | 73/105 |
| 6,955,078 | B2 * | 10/2005 | Mancevski et al. | 73/105 |
| 7,010,966 | B2 * | 3/2006 | Kitazawa et al. | 73/105 |
| 7,143,005 | B2 * | 11/2006 | Dahlen et al. | 702/168 |
| 7,333,191 | B2 | 2/2008 | Murayama, et al. | |
| 7,372,025 | B2 * | 5/2008 | Hoen et al. | 250/306 |
| 2002/0189330 | A1 * | 12/2002 | Mancevski et al. | 73/105 |
| 2003/0233870 | A1 * | 12/2003 | Mancevski | 73/105 |
| 2004/0123651 | A1 * | 7/2004 | Hantschel et al. | 73/105 |
| 2004/0140424 | A1 * | 7/2004 | Kwon et al. | 250/234 |
| 2004/0140426 | A1 * | 7/2004 | Kwon et al. | 250/234 |
| 2005/0242283 | A1 * | 11/2005 | Hasegawa et al. | 250/310 |
| 2006/0219899 | A1 * | 10/2006 | Ohta | 250/306 |
| 2006/0289749 | A1 * | 12/2006 | Hwu | 250/307 |

FOREIGN PATENT DOCUMENTS

| | | |
|---|---|---|
| JP | 08226926 A * | 9/1996 |
| JP | 11-344500 | 12/1999 |
| KR | 1995-7001127 | 2/1995 |
| KR | 1998-0042329 | 8/1998 |
| KR | 1999-0058966 | 7/1999 |
| KR | 2002-0067612 | 8/2002 |
| KR | 2003-0003249 | 1/2003 |
| KR | 2003-0013235 | 2/2003 |
| KR | 2003-0068375 | 8/2003 |
| KR | 2005-0048764 | 5/2005 |
| KR | 2005-0043885 | 11/2005 |
| KR | 2006-0101267 | 9/2006 |
| WO | WO 2005/103646 | 3/2005 |

* cited by examiner

SCANNING PROBE MICROSCOPE CAPABLE OF MEASURING SAMPLES HAVING OVERHANG STRUCTURE

CROSS-REFERENCE TO RELATED PATENT APPLICATIONS

This application claims the benefit of Korean Patent Application No. 10-2006-0096399, filed on Sep. 29, 2006, in the Korean Intellectual Property Office, the disclosure of which is incorporated herein in its entirety by reference.

BACKGROUND OF THE INVENTION

1. Field of the Invention

The present invention relates to a scanning probe microscope (SPM), and more particularly, to an SPM which precisely analyzes characteristics of samples having an overhang surface structure.

2. Description of the Related Art

Scanning probe microscopes (SPMs) have nano-scale resolution in order to show the shape of a surface of a sample or an electrical characteristic of the sample as an image. SPMs include atomic force microscopes (AFMs), magnetic force microscopes (MFMs), and scanning capacitance microscopes (SCMs). SPMs are used to analyze the shape of a surface of a sample or an electrical characteristic of the sample by moving a tip of a probe in contact with the surface of the sample or by moving the tip of the probe at a predetermined distance above the surface of the sample. However, in the case of a conventional scanning probe microscope, there is a problem in that the shape of a surface of a sample or an electrical characteristic of the sample cannot be precisely analyzed on a specific surface shape of the sample.

FIG. 1 is a schematic perspective view of a conventional scanning probe microscope. Referring to FIG. 1, a first scanner 31 and a second scanner 32 are attached to a frame 50. That is, the first scanner 31 is attached to a first frame 51 and the second scanner 32 is attached to a second frame 52. A probe 10 is attached to an end of the first scanner 31 and the first scanner 31 moves the probe 10 in a ±z-direction. A stage 20 is provided on the second scanner 32 and the second scanner 32 moves the stage 20 on an xy-plane. When a sample is disposed on the stage 20, the first scanner 31 moves the probe 10 in the ±z-direction and the second scanner 32 moves the stage 20, that is, the sample, on the xy-plane so that data related to the shape of a surface of the sample or an electrical characteristic of the sample can be obtained.

FIG. 2A is a schematic conceptual view for the case of analyzing a sample using the scanning probe microscope of FIG. 1, FIG. 2B is a schematic conceptual view of the shape of a surface of the sample obtained by analysis performed in FIG. 2A, FIG. 3A is a schematic conceptual view for the case of analyzing another sample using the scanning probe microscope of FIG. 1, and FIG. 3B is a schematic conceptual view of the shape of a surface of the sample obtained by analysis performed in FIG. 3A.

Referring to FIGS. 2A and 2B, while a probe 10 attached to a carrier 15 moves so that a predetermined distance between a tip 12 placed on an end of a cantilever 11 of the probe 10 and the surface of a sample 20 can be kept (or while the tip 12 and the surface of the sample 20 are closely attached to each other), data related to the surface shape of the sample 20 are collected. Actually, while the sample 20 moves in an xy-plane using a second scanner 32 (see FIG. 1) and the probe 10 moves on a ±z-axis indicated by 11 using a first scanner 31 (see FIG. 1), data related to the sample 20 are collected. As a result, when the surface shape of the sample 20 is realized, the same shape 20' as that of the sample 20 is realized, as illustrated in FIG. 2B.

However, if a sample has an overhang structure illustrated in FIG. 3A, correct data related to the sample cannot be obtained using the conventional scanning probe microscope. That is, while the probe 10 moves on the ±z-axis indicated by 11 using the first scanner 31 (see FIG. 1), data related to the sample 20 are collected. Thus, if a side surface 20a of the sample 20 is not a surface including the ±z-axis but is an inclined surface illustrated in FIG. 3, the probe 10 cannot scan the side surface 20a of the sample 20 having an overhang structure. Accordingly, when the surface shape of the sample 20 is realized using the conventional scanning probe microscope, there is a problem in that a different shape 20' from that of the sample 20 is realized as illustrated in FIG. 3B.

To solve this problem, a method using a probe 10 illustrated in FIG. 4 has been proposed. That is, the probe 10 has a protrusion 10a on its front end so that correct data related to a sample 20 having an overhang structure can be obtained using the protrusion 10a. However, when using the probe 10, it is not easy to manufacture the probe 10, excessive costs are required for its manufacture and the yield thereof is also low. In addition, since the probe 10 manufactured in such a way is not sharper than a conventional probe, there is a problem in that precise data related to a fine surface shape of nano-scale cannot be obtained. In the overhang structure of the sample, when the side surface 20a of the sample 20 is more inclined than the protrusion 10a of the probe 10, correct data related to the sample cannot be obtained even using the probe 10 illustrated in FIG. 4.

SUMMARY OF THE INVENTION

The present invention provides a scanning probe microscope which precisely analyzes characteristics of samples having an overhang surface structure.

According to an aspect of the present invention, there is provided a scanning probe microscope including: a first probe; a first scanner changing a position of the first probe along a straight line; and a second scanner changing a position of a sample in a plane, wherein the straight line in which the position of the first probe is changed by using the first scanner is non-perpendicular to the plane in which the position of the sample is changed by using the second scanner.

The scanning probe microscope may further include a second probe, and a third scanner changing a position of the second probe along a different straight line from the straight line in which the position of the first probe is changed, and the straight line in which the position of the second probe is changed by using the third scanner may be non-perpendicular to the plane in which the position of the sample is changed by using the second scanner.

According to another aspect of the present invention, there is provided a scanning probe microscope including: a first probe; a first scanner changing a position of the first probe along a straight line; a second scanner changing a position of a sample in a plane; and a first actuator changing an angle formed between the straight line in which the position of the first probe is changed by using the first scanner and the plane in which the position of the sample is changed by using the second scanner.

The first actuator may change an angle formed between the straight line in which the position of the first probe is changed by using the first scanner and the plane in which the position of the sample is changed by using the second scanner, by moving the first scanner.

The scanning probe microscope may further include a frame supporting the first scanner, and the first actuator may change an angle formed between the straight line in which the position of the first probe is changed by using the first scanner and the plane in which the position of the sample is changed by using the second scanner, by moving the frame supporting the first scanner.

The scanning probe microscope may further include a second probe, a third scanner changing a position of the second probe along a different straight line from the straight line in which the position of the first probe is changed, and a second actuator changing an angle formed between the straight line in which the position of the second probe is changed by using the third scanner and the plane in which the position of the sample is changed by using the second scanner.

The first actuator may change an angle formed between the straight line in which the position of the first probe is changed by using the first scanner and the plane in which the position of the sample is changed by using the second scanner, by moving the first scanner, and the second actuator may change an angle formed between the straight line in which the position of the second probe is changed by using the third scanner and the plane in which the position of the sample is changed by using the second scanner, by moving the third scanner.

The scanning probe microscope may further include a frame supporting the first scanner and a frame supporting the third scanner, the first actuator may change an angle formed between the straight line in which the position of the first probe is changed by using the first scanner and the plane in which the position of the sample is changed by using the second scanner, by moving the frame supporting the first scanner, and the second actuator may change an angle formed between the straight line in which the position of the second probe is changed by using the third scanner and the plane in which the position of the sample is changed by using the second scanner, by moving the frame supporting the third scanner.

The scanning probe microscope may further include a rotating device rotating the first scanner by 180 degrees around an axis which is perpendicular to a plane in which a position of a sample is changed and which passes the first probe, or rotating the position of the sample by 180 degrees in a plane.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 5:
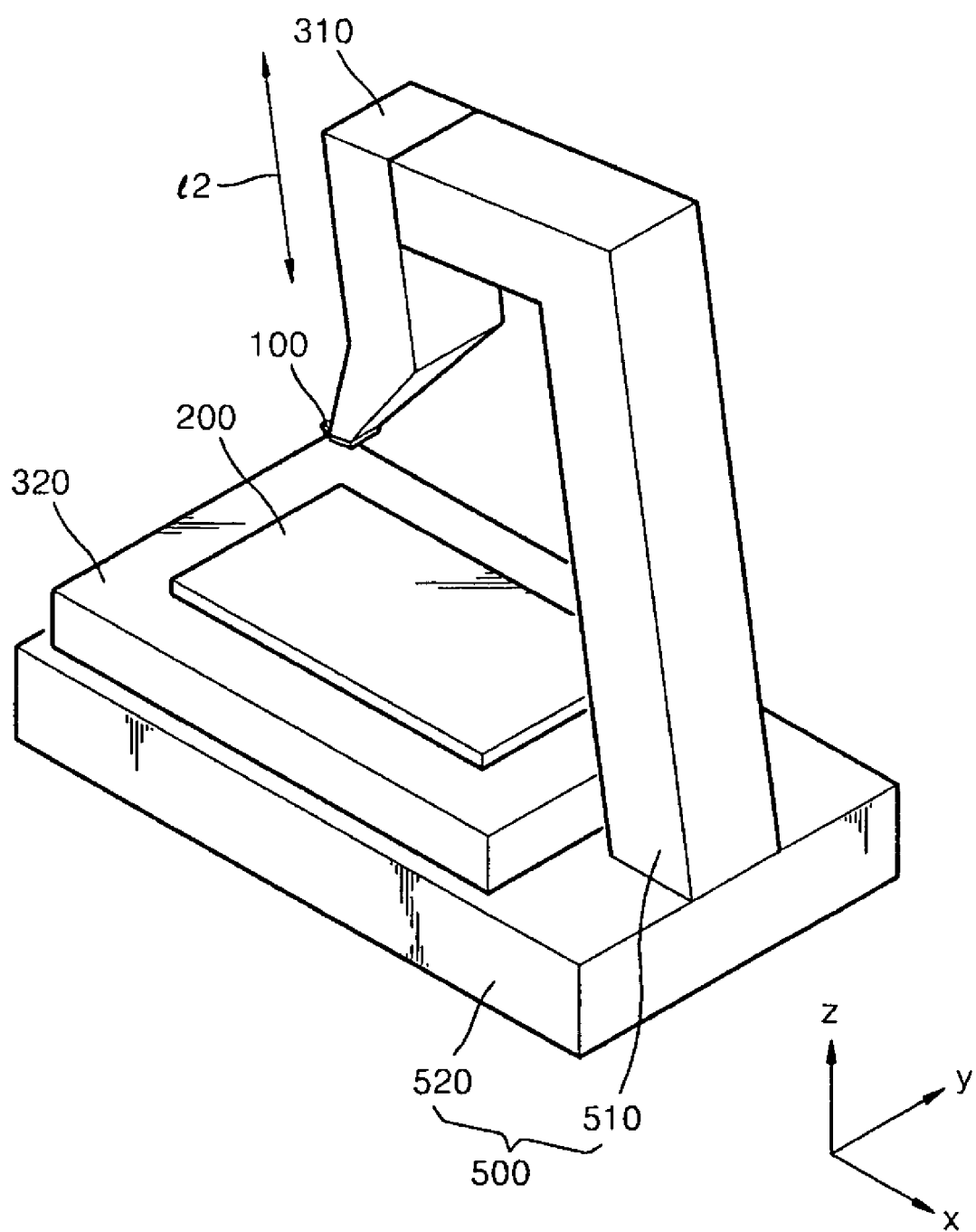
FIG. 5 is a schematic perspective view of a scanning probe microscope according to an embodiment of the present invention.

FIG. 5 is a schematic perspective view of a scanning probe microscope according to an embodiment of the present invention. Referring to FIG. 5, the scanning probe microscope includes a first probe 100, a first scanner 310, and a second scanner 320. Of course, if necessary, the scanning probe microscope may further include a frame 500 having a first frame 510 for supporting the first scanner 310 and a second frame 520 for supporting the second scanner 320, as illustrated in FIG. 5.

The first scanner 310 changes the position of the first probe 100 along a straight line l 2, and the second scanner 320 changes the position of a sample 200 in a plane (an xy-plane). In this case, the straight line l 2 in which the position of the first probe 100 is changed by using the first scanner 310 is not perpendicular to the plane (the xy-plane) in which the position of the sample 200 is changed by using the second scanner 320.

Figure 6A:
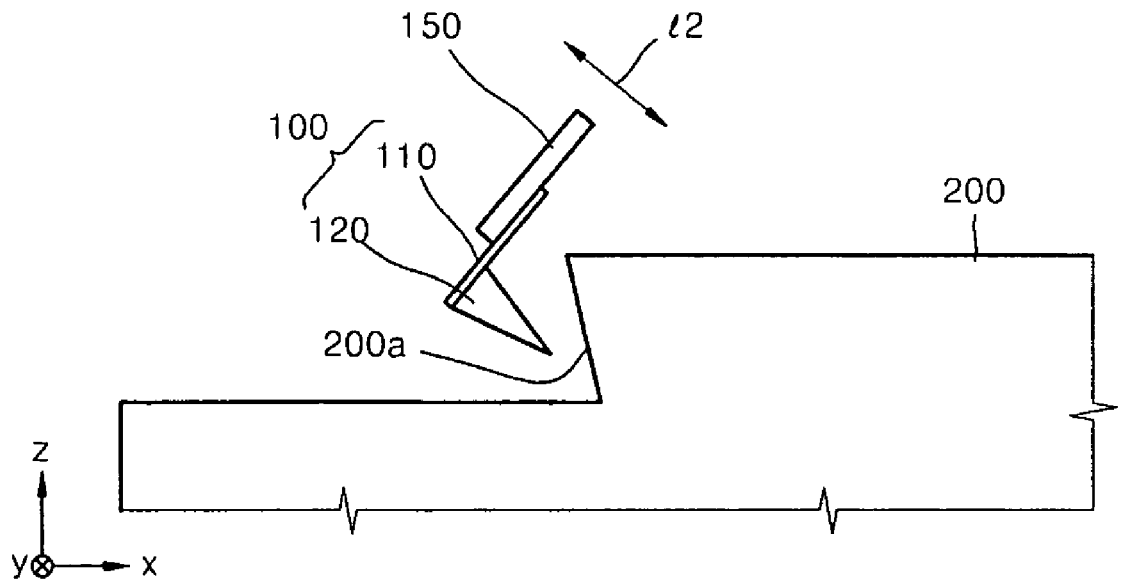
FIGS. 6A, 6B, and 6C are schematic conceptual views for the case of analyzing a sample using the scanning probe microscope of FIG. 5.
Figure 6B:
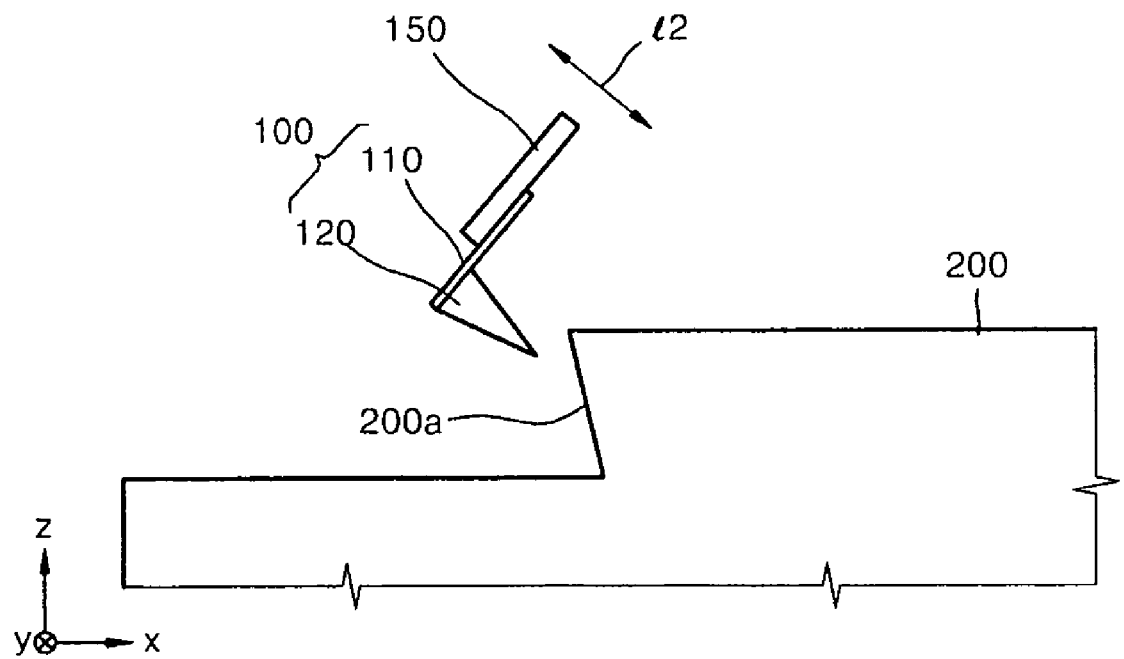

FIGS. 6A and 6B are schematic conceptual views for the case of analyzing a sample using the scanning probe microscope of FIG. 5. As illustrated in FIGS. 6A and 6B, a probe 100 may be attached to a carrier 150 if necessary. While the probe 100 moves so that a predetermined distance between a tip 120 placed on an end of a cantilever 110 of the probe 100 and the surface of a sample 200 can be kept (or while the tip 120 and the surface of the sample 200 are closely attached to each other), data related to the surface shape of the sample 200 are collected. Actually, while the sample 200 moves in an xy-plane using a second scanner 320 (see FIG. 5) and the probe 100 moves along a straight line indicated by l 2 using a first scanner 310 (see FIG. 1), data related to the sample 200 are collected.

As described previously, in the case of the scanning probe microscope illustrated in FIG. 5, the straight line l 2 in which the position of the first probe 100 is changed by using the first scanner 310 is not perpendicular to the plane (the xy-plane) in which the position of the sample 200 is changed by using the second scanner 320. Thus, even though the sample 200 has an overhang structure illustrated in FIGS. 6A and 6B, the tip 120 of the probe 100 can precisely scan a side surface 200a of the sample 200 so that data related to the surface of the sample 200 can be precisely collected. In addition, since components including a tip that has been used in the conventional scanning probe microscope can also be used without any changes in the scanning probe microscope illustrated in FIG. 5, a high-performance scanning probe microscope can be manufactured with the same yield as that of the prior art without an increase in manufacturing costs.

Figure 6C:
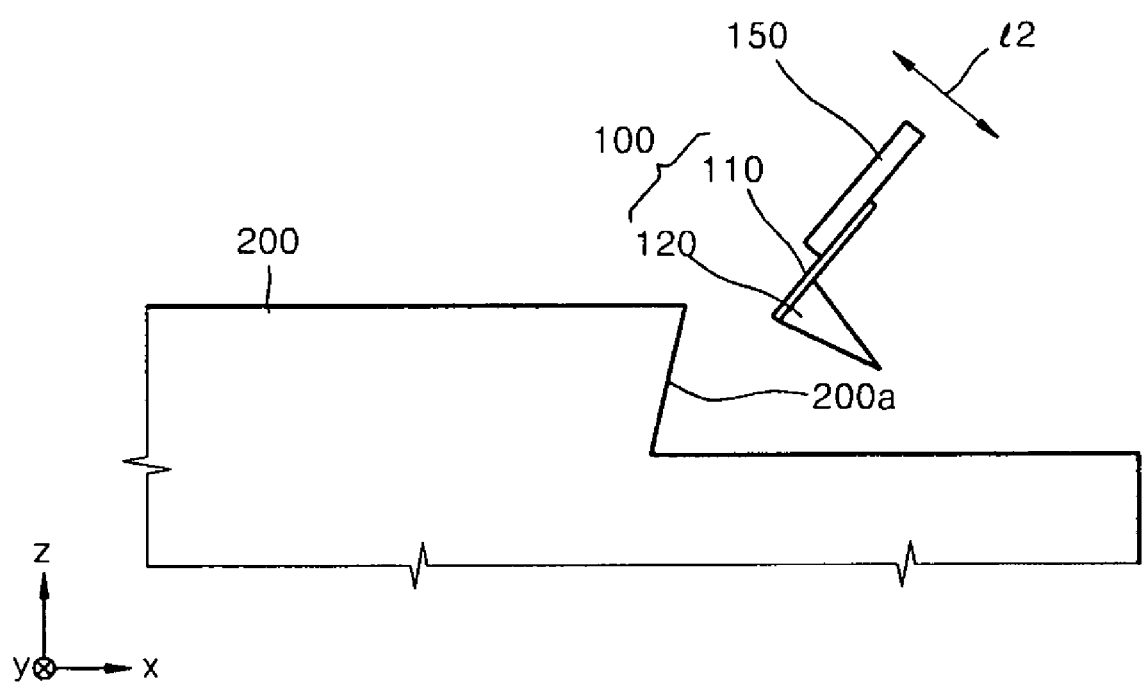

When data related to a sample are obtained using the scanning probe microscope illustrated in FIG. 5, with respect to the sample 200 having an overhang shape which is opposite to the overhang shape of the sample illustrated in FIGS. 6A and 6B and in which only a sample is rotated by 180 degrees in an xy-plane, as illustrated in FIG. 6C (not the sample 200 having an overhang shape illustrated in FIGS. 6A and 6B), the overhang-shaped side surface 200a of the sample 200 may not be precisely scanned. Thus, to solve the problem, the scanning probe microscope illustrated in FIG. 5 may further include a rotating device for rotating the sample 200 by 180 degrees within the xy-plane. By rotating the sample 200 illustrated in FIG. 6C using the rotating device, the overhang structure of the sample 200 may be placed with respect to the straight line l 2 in which the position of the probe 100 is changed by using the first scanner 310, as illustrated in FIG. 6A or 6B. Of course, a variety of modifications like that the rotating device may also rotate the first scanner 310, are possible. That is, the rotating device may also rotate the first scanner by 180 degrees around an axis which is perpendicular to the plane (the xy-plane) where the position of the sample is changed and which passes the probe 100. In addition, this configuration may also be applied to the scanning probe microscope according to another embodiments which will be described later, as well as the scanning probe microscope illustrated in FIG. 5.

Figure 7:
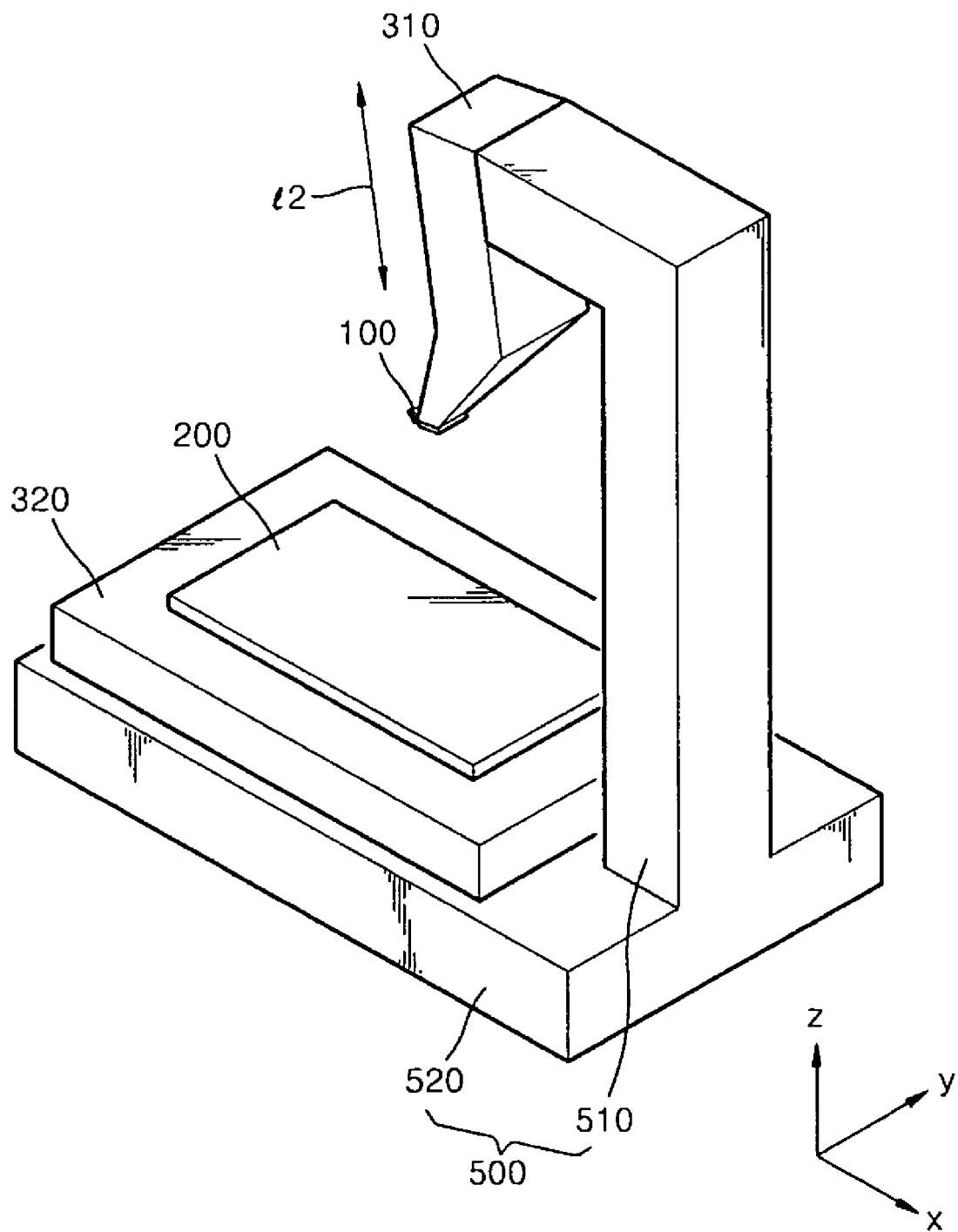
FIG. 7 is a schematic perspective view of a scanning probe microscope according to another embodiment of the present invention.

In the scanning probe microscope illustrated in FIG. 5, the first frame 510 for supporting the first scanner 310 is inclined so that the straight line l 2 in which the position of the first probe 100 is changed by using the first scanner 310 can be non-perpendicular to the plane (the xy-plane) in which the position of the sample 200 is changed by using the second scanner 320. However, various modifications that are different from the scanning probe microscope illustrated in FIG. 5 are possible. For example, like a scanning probe microscope illustrated in FIG. 7 according to another embodiment of the present invention, the first scanner 310 itself is non-perpendicular to the plane (the xy-plane) in which the position of the sample 200 is changed by using the second scanner 320 so that the straight line l 2 in which the position of the first probe 100 is changed by using the first scanner 310 can also be non-perpendicular to the plane (the xy-plane) in which the position of the sample 200 is changed by using the second scanner 320.

Meanwhile, an angle formed between the plane (the xy-plane) in which the position of the sample is changed by using the second scanner and the side surface of the sample having the overhang structure may be different according to samples. In this case, in order to obtain correct data related to the sample in the overhang structure of the sample, an angle formed between the straight line in which the position of the first probe is changed by using the first scanner and the plane (the xy-plane) in which the position of the sample is changed by using the second scanner needs to be properly adjusted according to the overhang structure of the sample. Thus, like a scanning probe microscope illustrated in FIG. 8 according to another embodiment of the present invention, the scanning probe microscope may further include a first actuator 410. The first actuator 410 serves to change an angle formed between the straight line l 2 in which the position of the first probe 100 is changed by using the first scanner 310 and the plane (the xy-plane) in which the position of the sample 200 is changed by using the second scanner 320.

Figure 8:
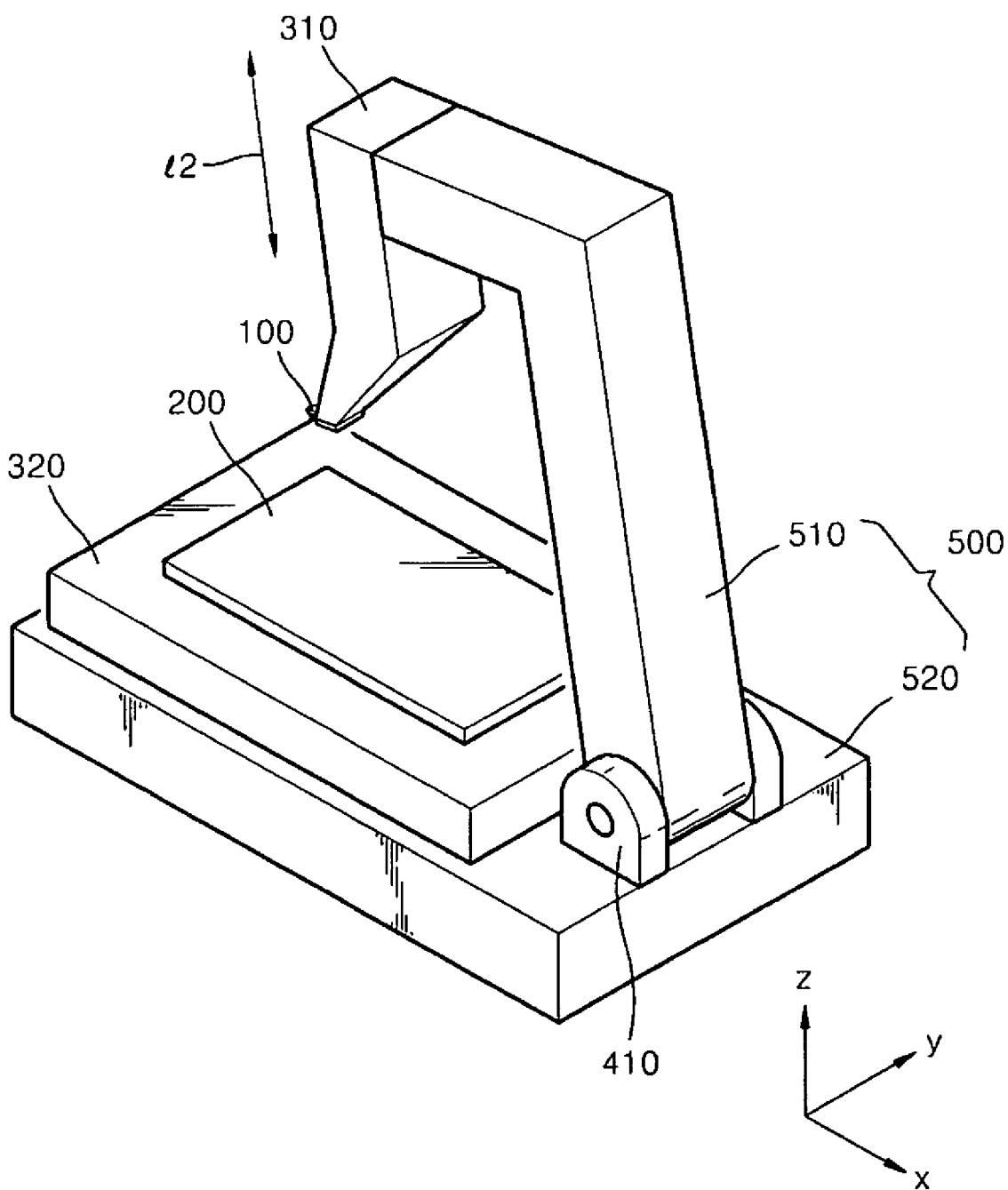
FIG. 8 is a schematic perspective view of a scanning probe microscope according to another embodiment of the present invention.
Figure 9:
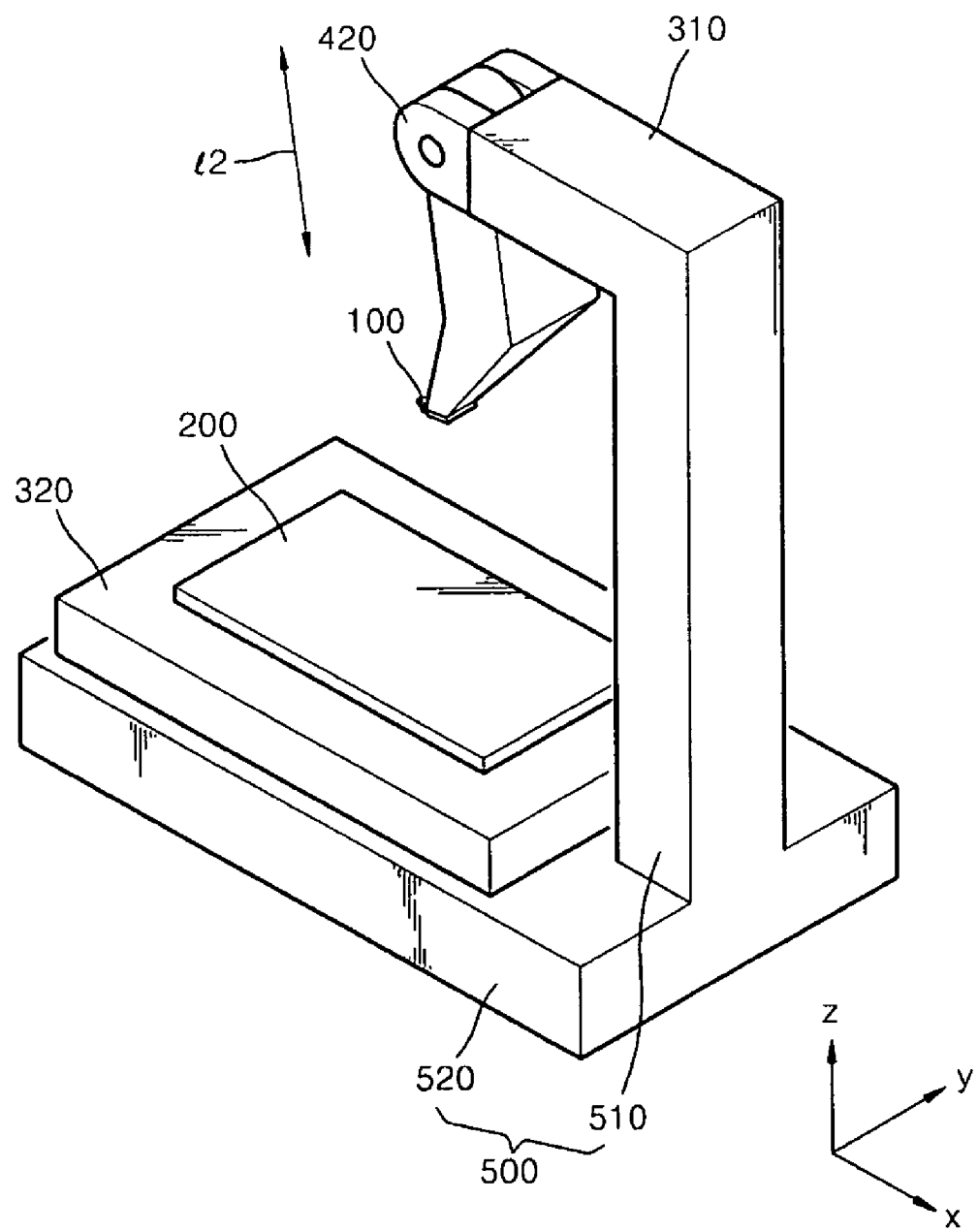
FIG. 9 is a schematic perspective view of a scanning probe microscope according to another embodiment of the present invention.

In the case of the scanning probe microscope illustrated in FIG. 8, the first actuator 410 moves the first frame 510 for supporting the first scanner 310 so that an angle formed between the straight line l 2 in which the position of the first probe 100 is changed by using the first scanner 310 and the plane (the xy-plane) in which the position of the sample 200 is changed by using the second scanner 320, can be changed. However, various modifications that are different from the scanning probe microscope of FIG. 8 are possible. For example, like a scanning probe microscope illustrated in FIG. 9 according to another embodiment of the present invention, the first actuator 410 moves the first scanner 310 so that an angle formed between the straight line l 2 in which the position of the first probe 100 is changed by using the first scanner 310 and the plane (the xy-plane) in which the position of the sample 200 is changed by using the second scanner 320 can also be changed.

Figure 1:
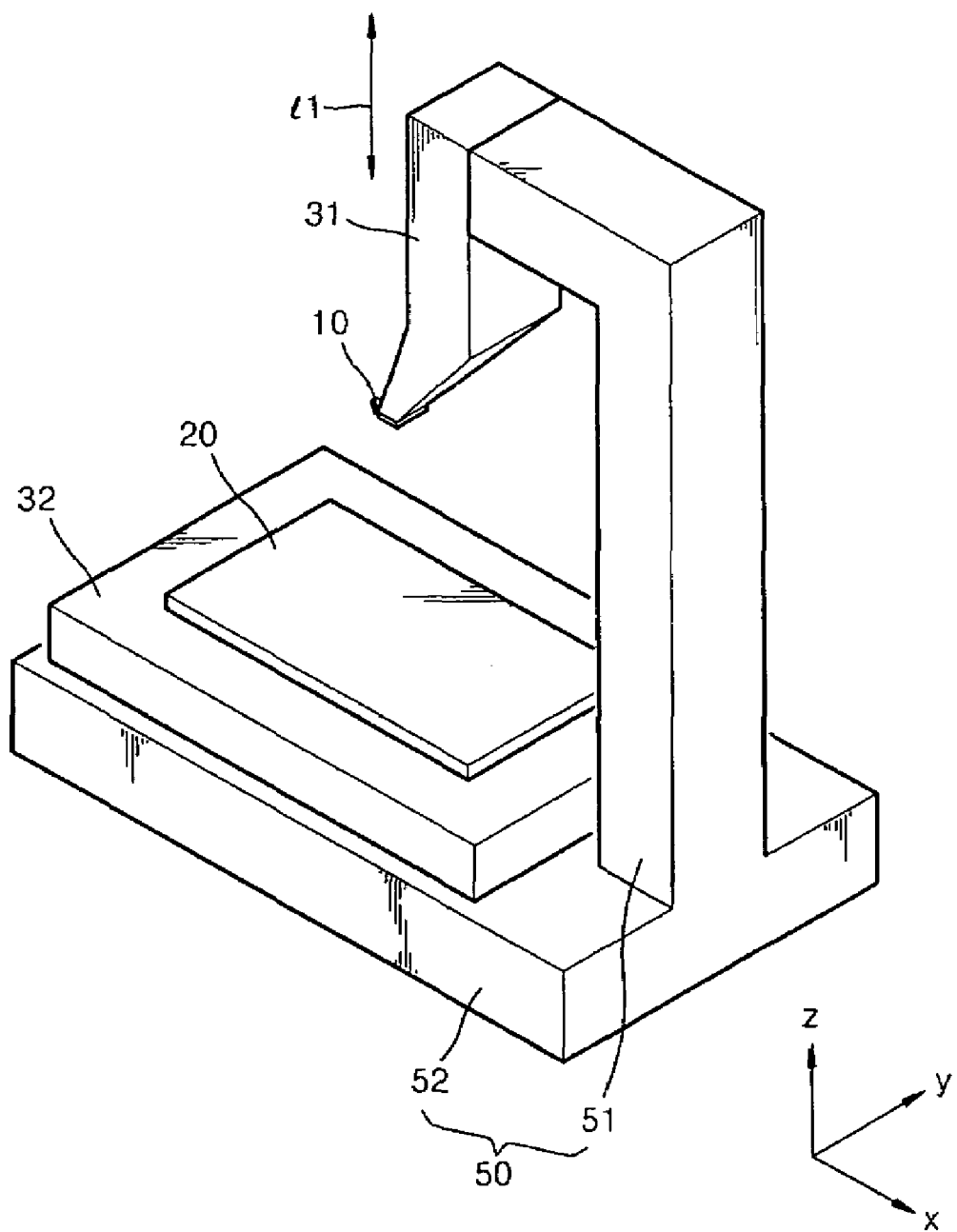
FIG. 1 is a schematic perspective view of a conventional scanning probe microscope.
Figure 2A:
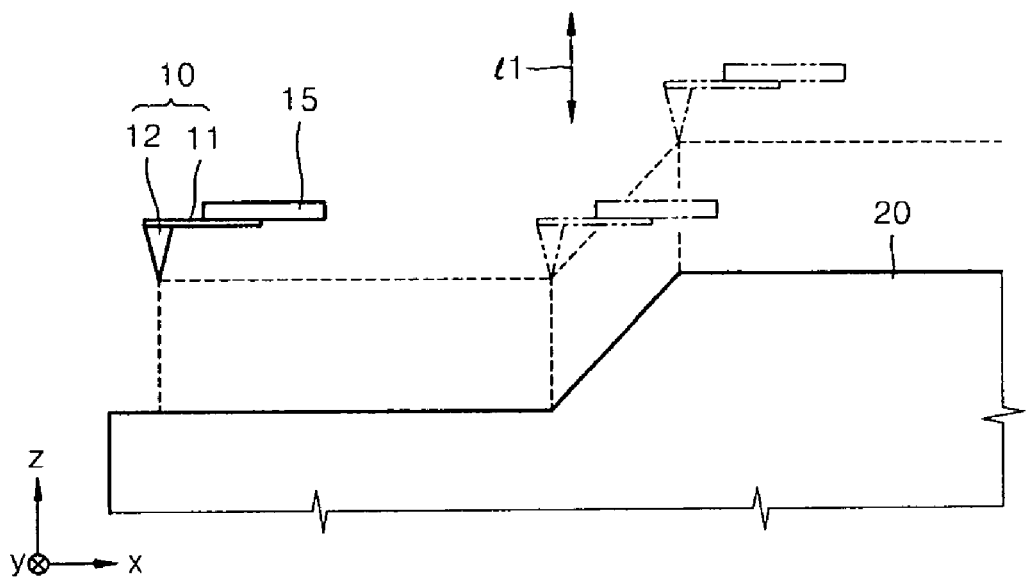
FIG. 2A is a schematic conceptual view for the case of analyzing a sample using the scanning probe microscope of FIG. 1.
Figure 2B:
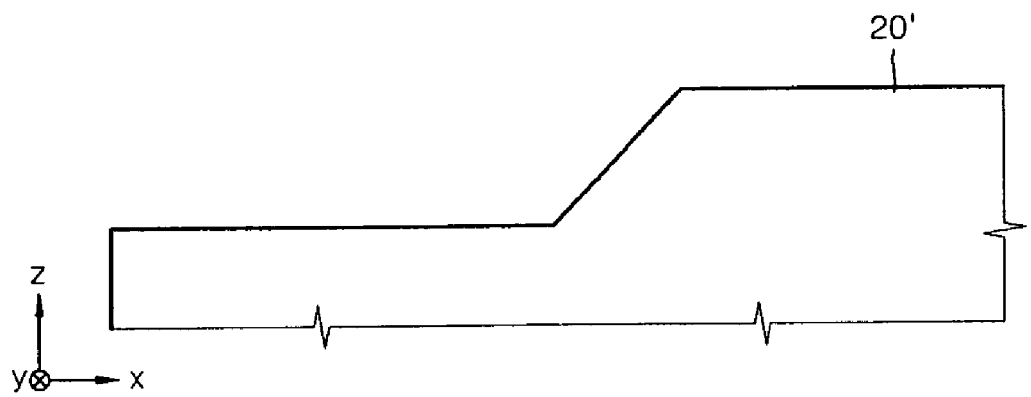
FIG. 2B is a schematic conceptual view of the shape of a surface of the sample obtained by analysis performed in FIG. 2A.
Figure 3A:
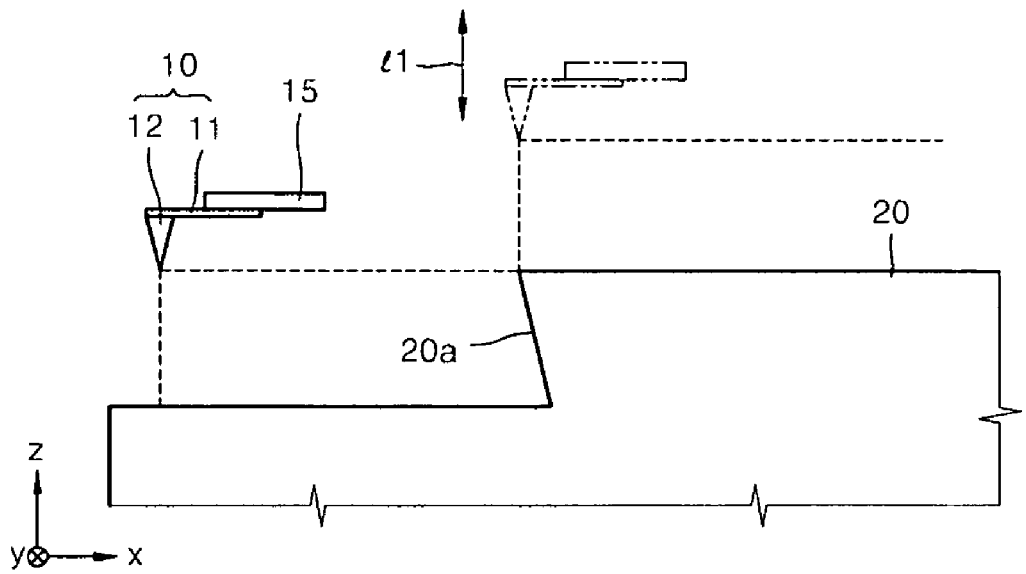
FIG. 3A is a schematic conceptual view for the case of analyzing another sample using the scanning probe microscope of FIG. 1.
Figure 3B:
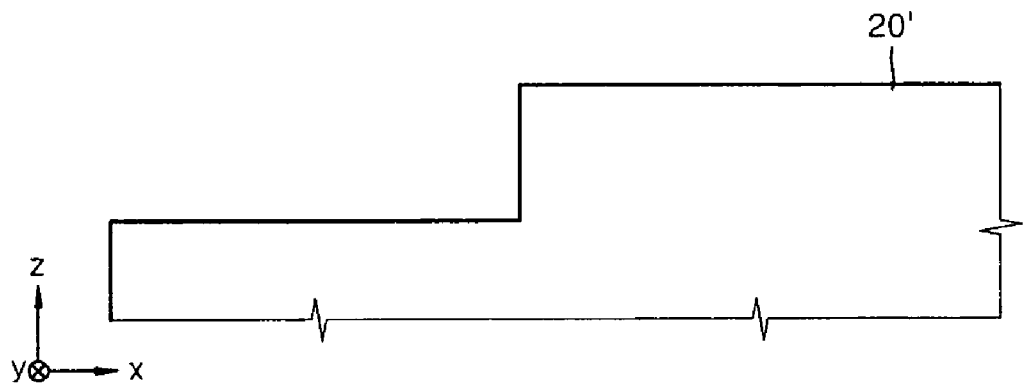
FIG. 3B is a schematic conceptual view of the shape of a surface of the sample obtained by analysis performed in FIG. 3A.
Figure 4:
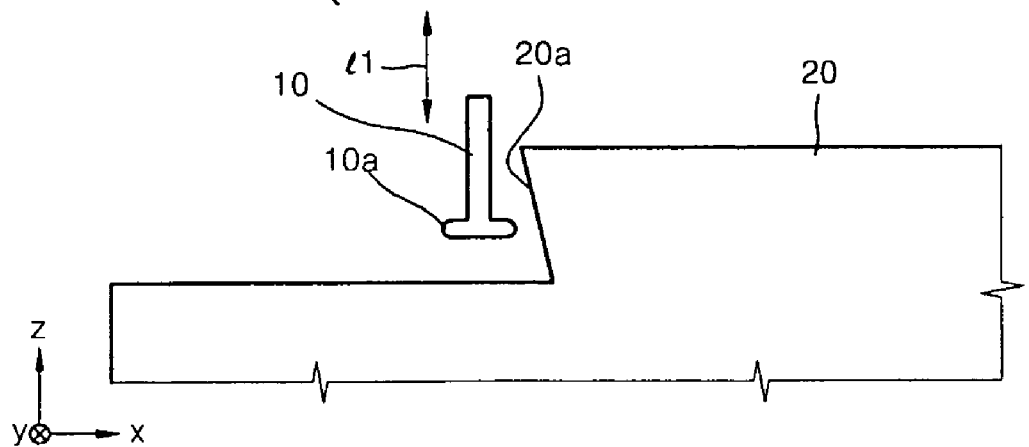
FIG. 4 is a schematic conceptual view for the case of analyzing a surface shape of a sample using another conventional scanning probe microscope.
Figure 10A:
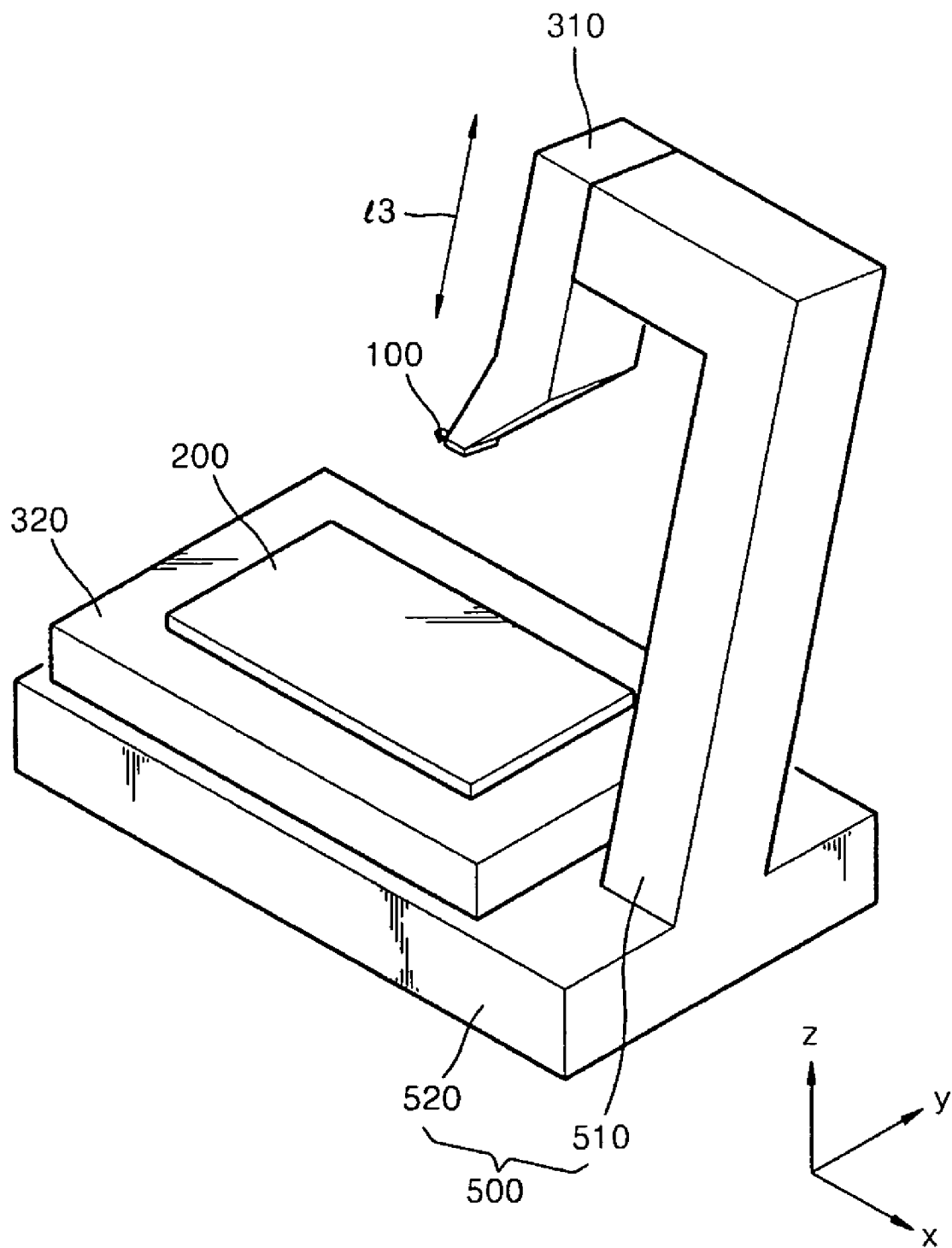
FIG. 10A is a schematic perspective view of a scanning probe microscope according to another embodiment of the present invention.
Figure 10B:
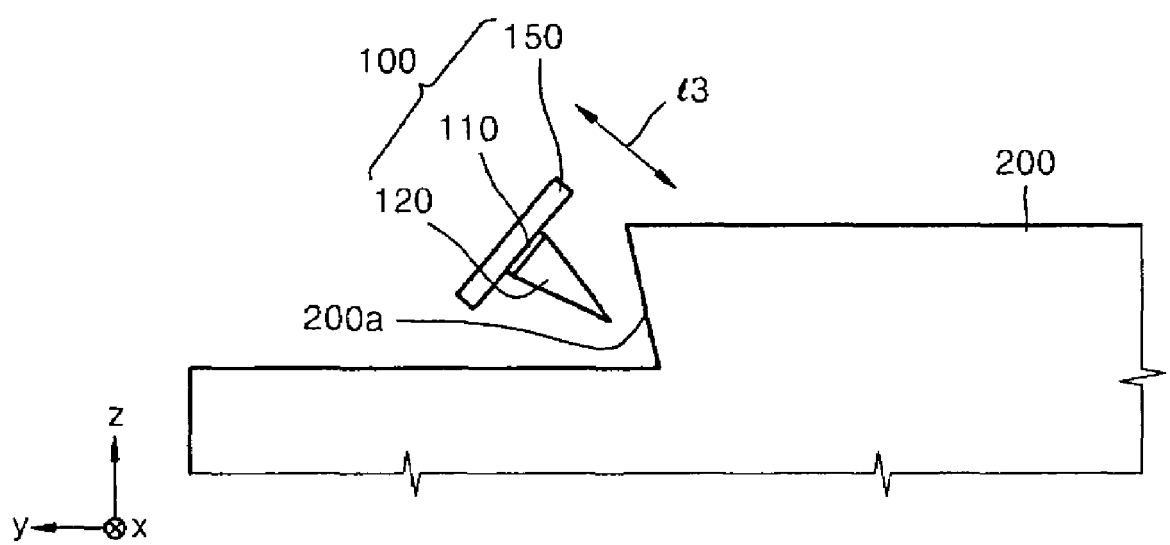
FIG. 10B is a schematic conceptual view for the case of analyzing a sample using the scanning probe microscope of FIG. 10A.

Meanwhile, in FIGS. 5, 7, 8, and 9, the straight line l 2 in which the position of the first probe 100 is changed by using the first scanner 310 of the scanning probe microscope is inclined in an −x-axis direction based on a coordinate system illustrated in each drawing of FIGS. 5, 7, 8, and 9 with respect to a straight line l 1 in which the position of the probe 10 is changed by using the first scanner 31 in the conventional scanning probe microscope illustrated in FIG. 1. However, the scanning probe microscope according to the present invention is not limited to this. That is, like a scanning probe microscope illustrated in FIGS. 10A and 10B according to another embodiment of the present invention, a straight line l 3 in which the position of the first probe 100 is changed by using the first scanner 310 may also be inclined in a y-axis direction based on the coordinate system illustrated in each drawing of FIGS. 5, 7, 8, 9, and 10A, with respect to the straight line l 1 in which the position of the probe 10 is changed by using the first scanner 31 in the conventional scanning probe microscope illustrated in FIG. 1. That is, the scanning probe microscope according to the present invention is sufficient that the straight line in which the position of the first probe is changed by using the first scanner is non-perpendicular to the plane in which the position of the sample is changed by using the second scanner. Alternatively, the scanning probe microscope according to the present invention is sufficient that an angle formed between the straight line in which the position of the first probe is changed by using the first scanner and the plane in which the position of the sample is changed by using the second scanner may be changed by the first actuator.

Figure 11:
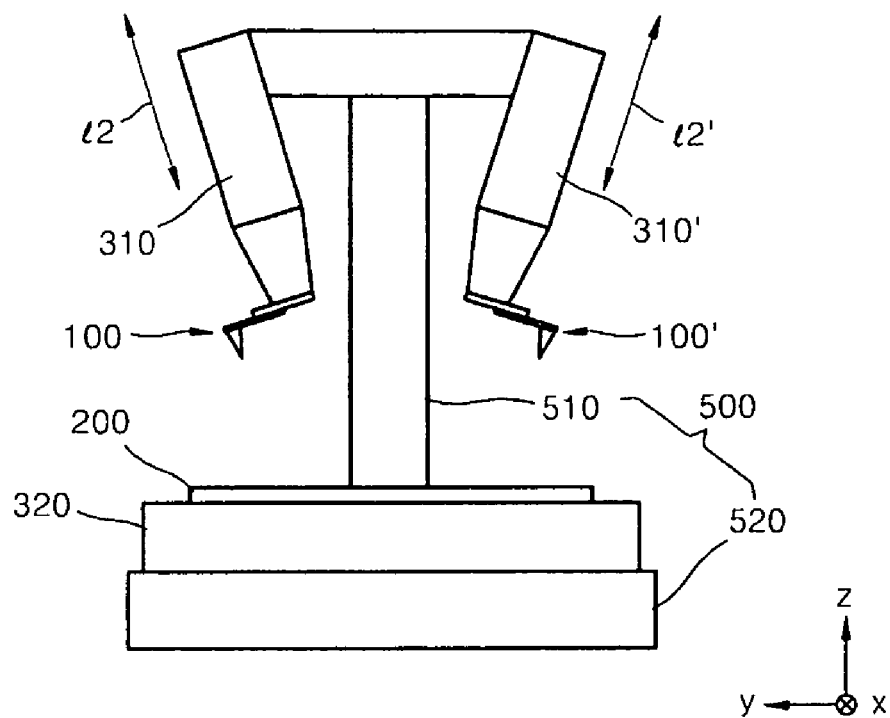
FIG. 11 is a schematic side view of a scanning probe microscope according to another embodiment of the present invention.

FIG. 11 is a schematic side view of a scanning probe microscope according to another embodiment of the present invention.

The scanning probe microscopes according to the above-described embodiments of FIGS. 5, 7, 8, 9, and 10A, a probe is one and the probe moves in a straight line using the first scanner. However, the scanning probe microscope illustrated in FIG. 11 further includes a second probe 100' except for the first probe 310. And, the scanning probe microscope of FIG. 11 includes a third scanner 310', and the third scanner 310' changes the position of the second probe 100' in a straight line 1 2' that is different from a straight line 1 2 in which the position of the first probe 100 is changed by using the first scanner 310. Of course, the straight line 1 2' in which the position of the second probe 100' is changed by using the third scanner 310' is non-perpendicular to the plane (the xy-plane) in which the position of the sample 200 is changed by using the second scanner 320. In this case, the straight line 1 2 in which the position of the first probe 100 is changed by using the first scanner 310 is changed and the straight line 1 2' in which the position of the second probe 100' is changed by using the third scanner 310' are on the same plane.

As described previously with reference to FIGS. 6A, 6B, and 6C, a position relationship between a direction where the side surface of the sample in the overhang shape of the sample is inclined and a straight line where the position of the probe is changed should be decided so that correct data related to the sample can be obtained. Thus, as illustrated in FIG. 11, the scanning probe microscope includes the first probe 100 and the second probe 100' and the straight line 1 2 in which the position of the first probe 100 is changed by using the first scanner 310' and the straight line 1 2' in which the position of the second probe 100' is changed by using the third scanner 310' are different from each other so that correct data related to side surfaces inclined in various directions in the overhang shape of the sample 200 can be obtained without rotating the sample 200.

Figure 12:
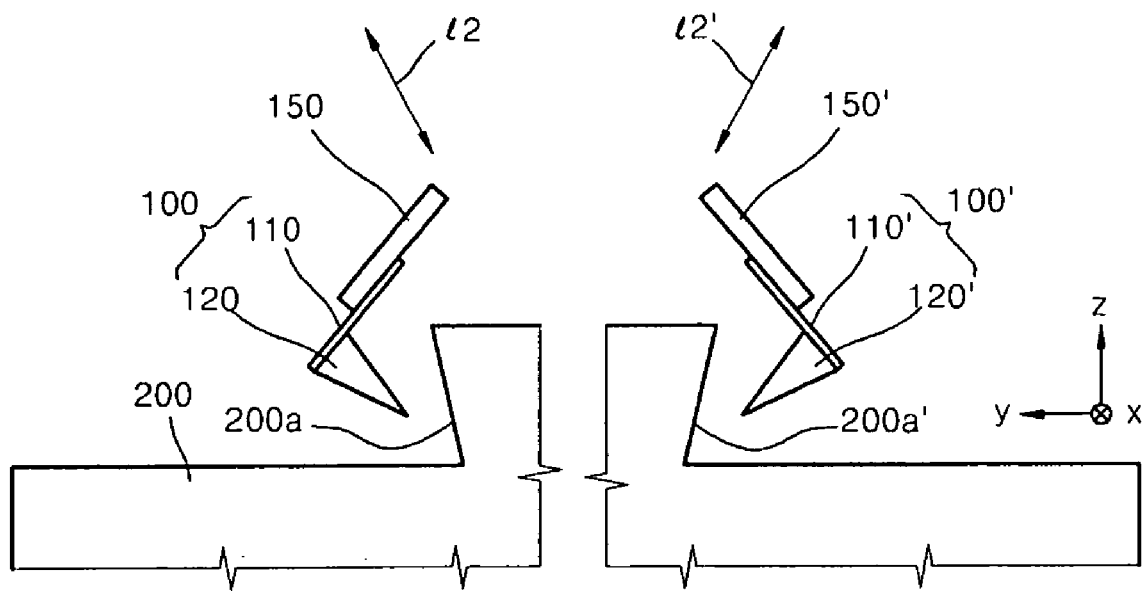
FIG. 12 is a schematic conceptual view for the case of analyzing a sample using the scanning probe microprobe of FIG. 11.

FIG. 12 is a schematic conceptual view for the case of analyzing a sample 200 using the scanning probe microscope of FIG. 11. It can be understood that correct data related to differently-inclined side surfaces 200a and 200a' can be obtained.

Of course, such a modification is not limited to the scanning probe microscope illustrated in FIG. 11. That is, as described in the above-described embodiments of FIGS. 5, 7, 8, 9, 10A, and 11, the scanning probe microscope of FIG. 12 may include a first actuator for moving a first scanner 310 and further include a second actuator for moving a third scanner 310'. In addition, of course, various modifications like that the first scanner 310 may be supported by a first frame, the third scanner 310' may be supported by a third frame, the first actuator may move the first frame for supporting the first scanner, and the second actuator may move the third frame for supporting the third scanner, are possible.

By using the scanning probe microscope according to the above-described embodiments of FIGS. 5, 7, 8, 9, 10A, and 11, even though a sample has an overhang structure, a tip of a probe can precisely scan a side surface of the sample having the overhang structure such that correct data related to the surface of the sample are collected. In addition, components including a tip that has been used in the conventional scanning probe microscope can also be used without any changes such that a high-performance scanning probe microscope is manufactured with the same yield without an increase in manufacturing costs.

As described above, according to the scanning probe microscope according to the present invention, characteristics of samples having an overhang structure can be precisely and correctly analyzed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A scanning probe microscope comprising:
 a first probe;
 first and second scanners for scanning a sample relative to the first probe while data relating to the sample are collected;
 the first scanner changing a position of the first probe along a straight line as the second scanner is changing a position of the sample so that a predetermined distance is maintained between the first probe and the sample; and
 the second scanner changing the position of the sample in a plane that is not perpendicular to the straight line.

2. The scanning probe microscope of claim 1, further comprising:
 a second probe; and
 a third scanner changing a position of the second probe along another straight line that is different from the straight line along which the position of the first probe is changed and
 is non-perpendicular to the plane in which the position of the sample is changed by using the second scanner.

3. The scanning probe microscope of claim 1, further comprising a rotating device rotating the first scanner by 180 degrees around an axis which is perpendicular to the plane in which the position of the sample is changed and which passes the first probe or rotating the position of the sample by 180 degrees in the plane in which the position of the sample is changed.

4. A scanning probe microscope comprising:
 a first probe;
 first and second scanners for scanning a sample relative to the first probe while data relating to the sample are collected;
 the first scanner changing a position of the first probe along a straight line as the second scanner is changing a position of the sample so that a predetermined distance is maintained between the first probe and the sample;
 the second scanner changing the position of the sample in a plane; and
 a first actuator changing an angle formed between the straight line along which the position of the first probe is changed by using the first scanner and the plane in which the position of the sample is changed by using the second scanner.

5. The scanning probe microscope of claim 4, wherein the first actuator changes an angle formed between the straight line along which the position of the first probe is changed by using the first scanner and the plane in which the position of the sample is changed by using the second scanner, by moving the first scanner.

6. The scanning probe microscope of claim 4, further comprising a frame supporting the first scanner, wherein the first actuator changes an angle formed between the straight line along which the position of the first probe is changed by using the first scanner and the plane in which the position of the sample is changed by using the second scanner, by moving the frame supporting the first scanner.

7. The scanning probe microscope of claim 4, further comprising:
 a second probe;
 a third scanner changing a position of the second probe along a different straight line from the straight line along which the position of the first probe is changed; and
 a second actuator changing an angle formed between the straight line along which the position of the second probe is changed by using the third scanner and the plane in which the position of the sample is changed by using the second scanner.

8. The scanning probe microscope of claim 7, wherein the first actuator changes an angle formed between the straight line along which the position of the first probe is changed by using the first scanner and the plane in which the position of the sample is changed by using the second scanner, by moving the first scanner, and the second actuator changes an angle formed between the straight line along which the position of the second probe is changed by using the third scanner and the plane in which the position of the sample is changed by using the second scanner, by moving the third scanner.

9. The scanning probe microscope of claim 7, further comprising a frame supporting the first scanner and a frame supporting the third scanner, wherein the first actuator changes an angle formed between the straight line along which the position of the first probe is changed by using the first scanner and the plane in which the position of the sample is changed by using the second scanner, by moving the frame supporting the first scanner, and the second actuator changes an angle formed between the straight line along which the position of the second probe is changed by using the third scanner and the plane in which the position of the sample is changed by using the second scanner, by moving the frame supporting the third scanner.

10. The scanning probe microscope of claim 4, further comprising a rotating device rotating the first scanner by 180 degrees around an axis which is perpendicular to the plane in which the position of the sample is changed and which passes the first probe, or rotating the position of the sample by 180 degrees in the plane in which the position of the sample is changed.

* * * * *